United States Patent
Rouet et al.

(10) Patent No.: US 7,324,113 B1
(45) Date of Patent: Jan. 29, 2008

(54) PERSPECTIVE CORRECTION COMPUTATION OPTIMIZATION

(75) Inventors: Christian Rouet, San Rafael, CA (US); Rui M. Bastos, Porto Alegre (BR); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 325 days.

(21) Appl. No.: 11/076,200

(22) Filed: Mar. 9, 2005

(51) Int. Cl.
*G06T 1/00* (2006.01)
*G09G 5/00* (2006.01)

(52) U.S. Cl. .................................. 345/522; 345/582
(58) Field of Classification Search ............... 345/522
See application file for complete search history.

(56) References Cited

U.S. PATENT DOCUMENTS

| 5,798,762 | A | * | 8/1998 | Sfarti et al. ............... 345/420 |
| 5,936,627 | A | * | 8/1999 | Brown ...................... 345/419 |
| 5,973,705 | A | * | 10/1999 | Narayanaswami .......... 345/505 |
| 6,043,820 | A | * | 3/2000 | Iimura et al. ............... 345/422 |
| 6,396,502 | B1 | * | 5/2002 | Cunniff ...................... 345/582 |
| 6,731,303 | B1 | * | 5/2004 | Marino ...................... 345/620 |
| 6,903,741 | B2 | * | 6/2005 | Corbetta .................... 345/426 |
| 2004/0237074 | A1 | * | 11/2004 | Aronson et al. ............ 717/158 |
| 2006/0098017 | A1 | * | 5/2006 | Tarditi et al. ............... 345/505 |
| 2006/0107250 | A1 | * | 5/2006 | Tarditi et al. ............... 717/105 |

* cited by examiner

*Primary Examiner*—Ulka Chauhan
*Assistant Examiner*—Jason M Repko
(74) *Attorney, Agent, or Firm*—Patterson & Sheridan, LLP

(57) ABSTRACT

A method of optimizing perspective correction computations to be executed in a programmable fragment shader, identifying a sequence of program instructions; determining whether the sequence of program instructions can be optimized based on the status of the bit; sourcing one or more interpolated texture map coordinates to thereby disable the perspective correction computation comprising division by (1/w); and enabling the optimized execution of one of a plurality of perspective computation functions by a sought operation in a shader unit without division of the interpolated texture maps coordinates by (1/w). The optimized function includes able mapping, projective mapping, normalization, or scaling invariant operations.

20 Claims, 6 Drawing Sheets

PERSPECTIVE CORRECTION COMPUTATION OPTIMIZATION

BACKGROUND OF THE INVENTION

1. Field of the Invention

Embodiments of the present invention generally relate to graphics processing and, more specifically, to perspective correction computations used for three-dimensional graphics processing.

2. Description of the Related Art

Conventional three-dimensional (3D) graphics processing includes perspective correction computations, including division by a perspective correction parameter. Division operations are expensive in term of performance, typically requiring more clock cycles to complete compared with other arithmetic operations such as addition, subtraction, or multiplication. Division performance may be improved by dedicating special purpose computing elements to performing division. However, those special purpose computing elements may be underutilized when division is not necessary.

Accordingly, there is a need to handle division operations that appear in program instructions more effectively.

SUMMARY OF THE INVENTION

The current invention involves new systems and methods for optimizing a sequence of program instructions by disabling unnecessary perspective correction computations. A perspective correction computation, such as division by a perspective parameter may be disabled for one or more instructions in the sequence of program instructions. The optimizations may result in a more efficient use of computing resources and improved performance without compromising image quality.

Various embodiments of the invention include a system for processing shader program instructions. The system includes a perspective correction computation unit and an instruction scheduling unit. The perspective correction computation unit is configured to perform a step of dividing a value by a perspective correction parameter to produce a perspective corrected value. The instruction scheduling unit is configured to disable of the step of dividing the value by the perspective correction parameter based on a per instruction optimization.

Various embodiments of a method of the invention for optimizing perspective correction computations, include identifying a perspective correction computation in a sequence of program instructions, determining whether the perspective correction computation in the sequence of program instructions can be optimized, and indicating that the perspective correction computation should not be performed when the sequence of program instructions is executed.

Various embodiments of a method of the invention for performing computations using perspective correction, include receiving a program instruction from a sequence of program instructions, determining whether the program instruction indicates that dividing by a perspective correction parameter is disabled, and scheduling the program instruction for execution without dividing by the perspective correction parameter

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
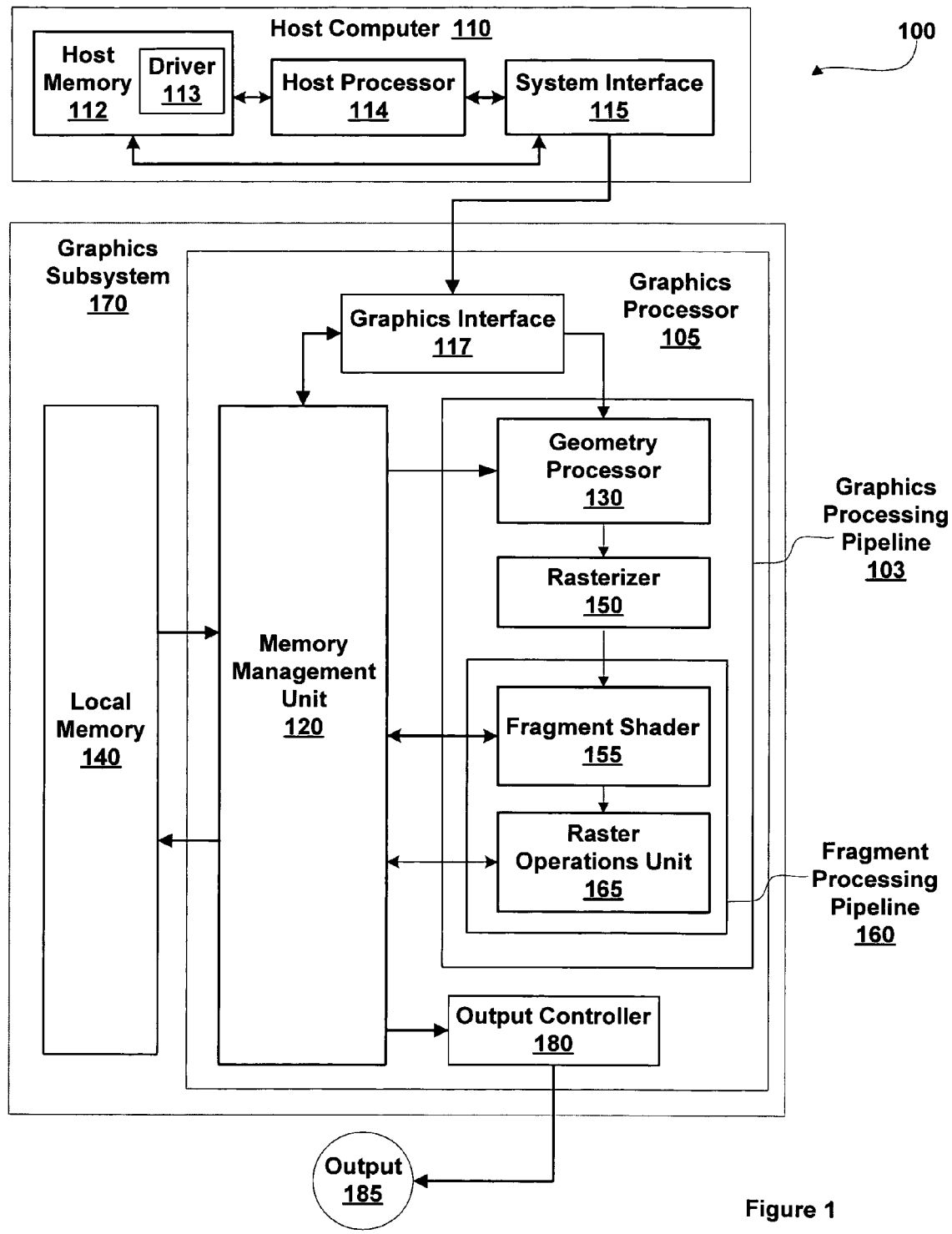
FIG. 1 is a block diagram of a graphics processing system in accordance with one or more aspects of the present invention.

FIG. 1 is a block diagram of an exemplary embodiment of a respective computer system, generally designated 100, and including a host computer 110 and a graphics subsystem 170 in accordance with one or more aspects of the present invention. Computing system 100 may be a desktop computer, server, laptop computer, palm-sized computer, tablet computer, game console, portable wireless terminal such as a PDA or cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. An example of system interface 115 known in the art includes INTEL® Northbridge.

A graphics device driver, driver 113, interfaces between processes executed by host processor 114, such as application programs, and a programmable graphics processor 105, translating program instructions as needed for execution by programmable graphics processor 105. Driver 113 also uses commands to configure sub-units within programmable graphics processor 105. Specifically, driver 113 may enable or disable perspective correction computations for one more program instructions within an instruction sequence, as described in conjunction with FIG. 2A.

Graphics subsystem 107 includes a local memory 140 and programmable graphics processor 105. Host computer 110 communicates with graphics subsystem 170 via system interface 115 and a graphics interface 117 within programmable graphics processor 105. Data, program instructions, and commands received at graphics interface 117 can be passed to a graphics processing pipeline 803 or written to a local memory 140 through memory management unit 120. Programmable graphics processor 105 uses memory to store graphics data, including texture maps, and program instructions, where graphics data is any data that is input to or output from computation units within programmable graphics processor 105. Graphics memory is any memory used to store graphics data or program instructions to be executed by programmable graphics processor 105. Graphics memory can include portions of host memory 112, local memory 140 directly coupled to programmable graphics processor 105, storage resources coupled to the computation units within programmable graphics processor 105, and the like. Storage resources can include register files, caches, FIFOs (first in first out memories), and the like.

In addition to Interface 117, programmable graphics processor 105 includes a graphics processing pipeline 103, a memory controller 120 and an output controller 180. Data and program instructions received at interface 117 can be passed to a geometry processor 130 within graphics processing pipeline 103 or written to local memory 140 through memory controller 120. In addition to communicating with local memory 140, and interface 117, memory controller 120 also communicates with graphics processing pipeline 103 and output controller 180 through read and write interfaces in graphics processing pipeline 103 and a read interface in output controller 180.

Within graphics processing pipeline 103, geometry processor 130 and a programmable graphics fragment processing pipeline, fragment processing pipeline 160, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 130 and fragment processing pipeline 160 are optionally configured such that data processing operations are performed in multiple passes through graphics processing pipeline 103 or in multiple passes through fragment processing pipeline 160. Each pass through programmable graphics processor 105, graphics processing pipeline 103 or fragment processing pipeline 160 concludes with optional processing by a raster operations unit 165.

Vertex programs are sequences of vertex program instructions compiled by host processor 114 for execution within geometry processor 130 and rasterizer 150. Shader programs are sequences of shader program instructions compiled by host processor 114 for execution within fragment processing pipeline 160. Geometry processor 130 receives a stream of program instructions (vertex program instructions and shader program instructions) and data from interface 117 or memory controller 120, and performs vector floating-point operations or other processing operations using the data. The program instructions configure subunits within geometry processor 130, rasterizer 150 and fragment processing pipeline 160. The program instructions and data are stored in graphics memory, e.g., portions of host memory 112, local memory 140, or storage resources within programmable graphics processor 105. When a portion of host memory 112 is used to store program instructions and data the portion of host memory 112 can be uncached so as to increase performance of access by programmable graphics processor 105. Alternatively, configuration information is written to registers within geometry processor 130, rasterizer 150 and fragment processing pipeline 160 using program instructions, encoded with the data, or the like.

Data processed by geometry processor 130 and program instructions are passed from geometry processor 130 to a rasterizer 150. Rasterizer 150 is a sampling unit that processes primitives and generates sub-primitive data, such as fragment data, including parameters associated with fragments (texture identifiers, texture coordinates, and the like). Rasterizer 150 converts the primitives into sub-primitive data by performing scan conversion on the data processed by geometry processor 130. Rasterizer 150 outputs fragment data and shader program instructions to fragment processing pipeline 160.

The shader programs configure the fragment processing pipeline 160 to process fragment data by specifying computations and computation precision. Fragment shader 155 is optionally configured by shader program instructions such that fragment data processing operations are performed in multiple passes within fragment shader 155. Fragment shader 155 includes one or more fragment shader pipelines which may be configured to perform shading functions such as, attribute interpolation, perspective correction, texture mapping, blending, and the like, as described in conjunction with FIG. 3A to produce shaded fragment data.

Fragment shader 155 outputs the shaded fragment data, e.g., color and depth, and codewords generated from shader program instructions to raster operations unit 165. Raster operations unit 165 includes a read interface and a write interface to memory controller 120 through which raster operations unit 165 accesses data stored in local memory 140 or host memory 112. Raster operations unit 165 optionally performs near and far plane clipping and raster operations, such as stencil, z test, blending, and the like, using the fragment data and pixel data stored in local memory 140 or host memory 112 at a pixel position (image location specified by x,y coordinates) associated with the processed fragment data. The output data from raster operations unit 165 is written back to local memory 140 or host memory 112 at the pixel position associated with the output data and the results, e.g., image data are saved in graphics memory.

When the data, program instructions, and commands received by graphics subsystem 170 have been completely processed by graphics processor 105, an output 185 of graphics subsystem 170 is provided using an output controller 180. Output controller 180 is optionally configured to deliver processed data to a display device, network, electronic control system, other computing system such as computing system 100, other graphics subsystem 170, or the like. Alternatively, the processed data is output to a film recording device or written to a peripheral device, e.g., disk drive, tape, compact disk, or the like.

Figure 2A:
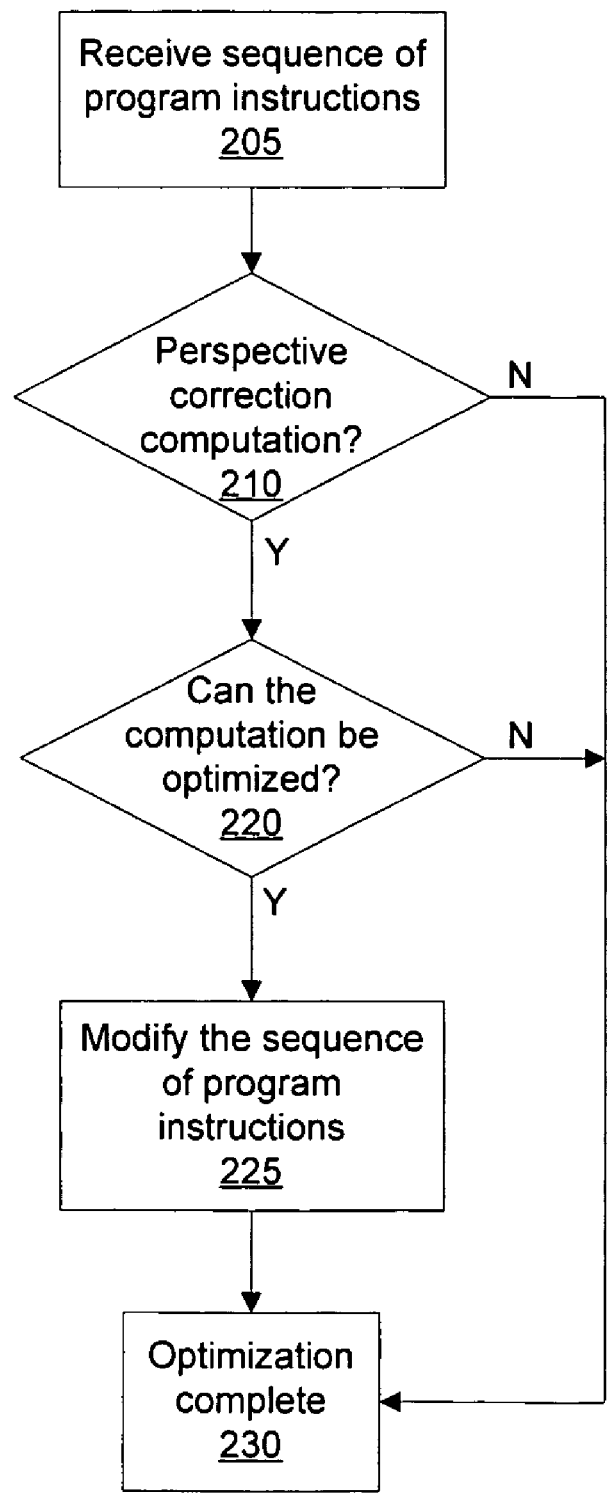
FIG. 2A illustrates a flow diagram of an exemplary method of optimizing a sequence of program instructions in accordance with one or more aspects of the present invention.

Driver 113 may be configured to process a sequence of instructions included in a shader program and produce an optimized sequence of program instructions, disabling perspective correction computations for one more program instructions within the sequence. FIG. 2A illustrates an embodiment of a method of optimizing a sequence of program instructions in accordance with one or more aspects of the present invention. In step 205 driver 113 receives a sequence of program instructions. In step 210 driver 113 identifies any program instructions within the sequence that perform a perspective correction computation. In some embodiments of the present invention, driver 113 identifies program instructions which include an implicit or explicit division of an interpolated fragment attribute, e.g., color or texture map coordinate, by a perspective correction parameter, such as 1/w.

If, in step 210 driver 113 determines that none of the program instructions perform a perspective correction computation, then in step 230 the optimization process is complete. If, in step 210 driver 113 determines that one or more of the program instructions perform a perspective correction computation, then in step 220 driver 113 scans the program instructions and determines if any of the one or more perspective correction computations can be optimized. If, in step 220 driver 113 determines that none of the one or more perspective correction computations can be optimized, then in step 230 the optimization process is complete. If, in step 210 driver 113 determines that one or more of the perspective correction computations can be optimized, then in step 225 driver 113 modifies the sequence of program instructions to produce an optimized sequence of program instructions, as described in conjunction with FIG. 2B.

When driver 113 determines that a particular perspective correction computation is not needed to compute a result and may therefore be optimized, driver 113 indicates that the particular perspective correction computation should not be performed when the sequence of program instructions is executed. In some embodiments of the present invention, driver 113 sets a bit within a program instruction to disable execution of the particular perspective correction computation. In other embodiments of the present invention, driver 113 may replace the program instruction with a different program instruction that does not perform the particular perspective correction computation.

Figure 2B:
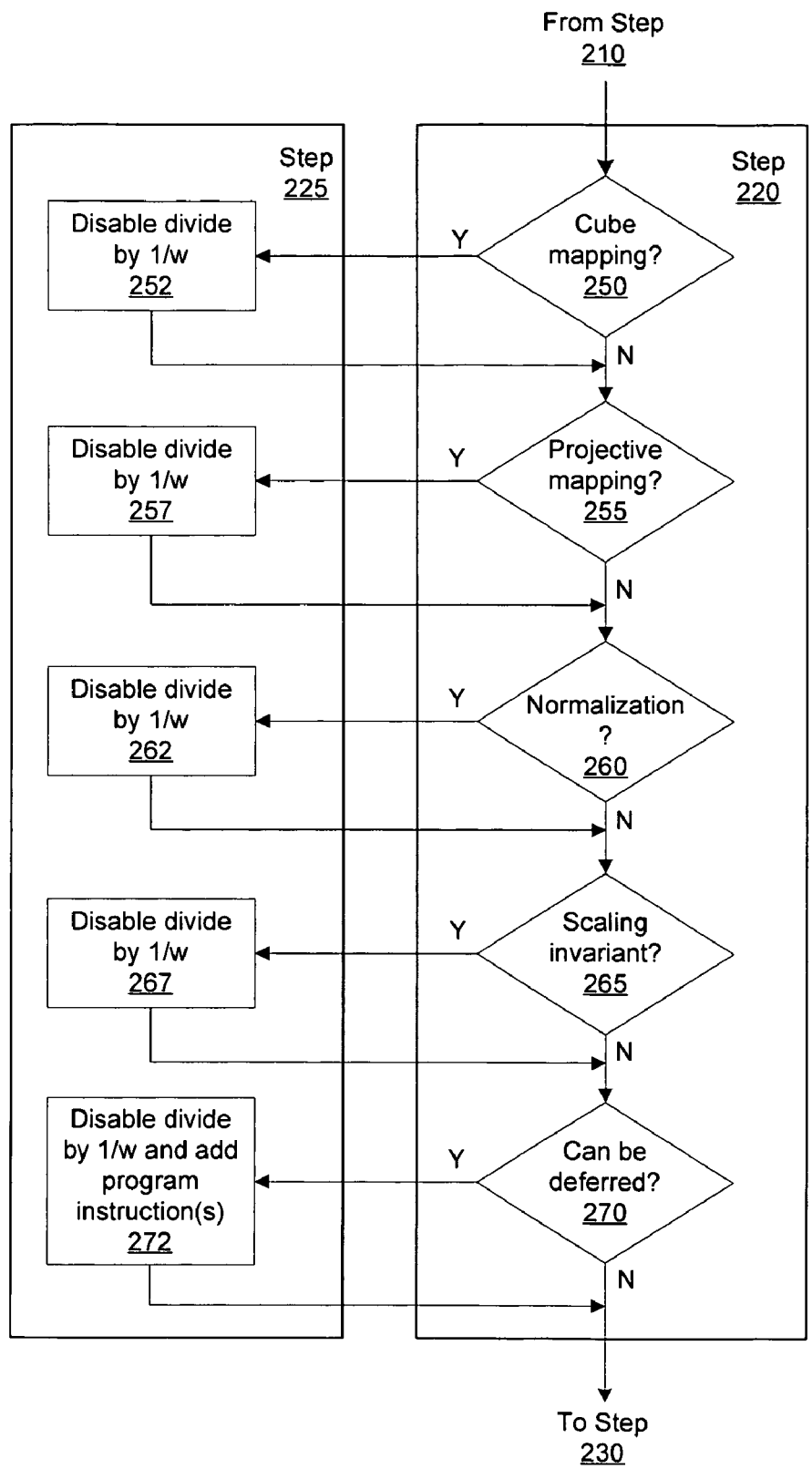
FIG. 2B illustrates a flow diagram of an exemplary method of performing a step shown in FIG. 2A in accordance with one or more aspects of the present invention.

FIG. 2B illustrates an embodiment of a method of performing steps 220 and 225 of FIG. 2A in accordance with one or more aspects of the present invention. Optimization of the sequence of program instructions is possible when disabling one or more perspective correction computations will not affect the result. In some cases the perspective correction computation may simply be disabled. In other cases, the perspective correction computation may be disabled and the program instruction performing the perspective correction computation may be changed or another program instruction may be changed such that the result will not be affected.

During graphics processing, interpolated texture map coordinates such as s, t, r, and q, are computed as s/w, t/w, r/w, and q/w, respectively, to produce per fragment texture coordinates. When the texture map coordinates are sourced for an operation, they are each divided by 1/w to produce perspective corrected texture map coordinates, s, t, r, and q. The divide by 1/w is implicit, i.e., is performed automatically when the per fragment texture coordinates are sourced by a program instruction, and may be disabled by driver 113. Driver 113 may disable the implicit perspective correction computation of dividing by 1/w when the fragment texture coordinates are sourced by a program instruction.

The method begins in step 250 where driver 113 determines if one or more of the perspective correction computations are used to perform a cube mapping operation. During cube mapping, each of the interpolated texture map coordinates is divided by one of the interpolated texture map coordinates, thereby canceling any common divisors, such as 1/w. Rather than performing the perspective correction computation of dividing an interpolated texture map coordinate, such as s/w, by 1/w to produce the perspective corrected texture map coordinate, s, the perspective correction computation is disabled and s/w is used to perform the cube mapping function. Specifically, when the perspective correction computation is disabled and cube mapping is performed, s/w is divided by one of s/w, t/w, and r/w, resulting in 1, s/t, and s/r, respectively. In comparison, when perspective correction is not disabled, s/w, t/w, and r/w are each divided by 1/w to produce s, t, and r, respectively. Then, when cube mapping is performed, s is divided by one of s, t, and r, resulting in 1, s/t, and s/r, respectively. Note that the result is the same with the perspective correction computation disabled as it is with the perspective correction computation enabled. Therefore, the result will not be affected by the perspective correction computation and the disabled perspective correction computation is not needed to produce the result.

If, in step 250 driver 113 determines that one or more of the perspective correction computations is used to perform a cube mapping operation, then in step 252, driver 113 optimizes each program instruction by modifying each program instruction to source the interpolated texture map coordinates for a cube mapping function, thereby disabling the implicit perspective correction computation. In an alternative embodiment of the present invention, driver 113 removes one or more program instructions that explicitly perform the perspective correction computation to compute the perspective corrected texture map coordinates or disables execution of those program instructions. Driver 113 then proceeds to step 255.

If, in step 250 driver 113 determines that none of the perspective correction computations is used to perform a cube mapping operation, then driver 113 proceeds to step 255. In step 255 driver 113 determines if one or more of the perspective correction computations is used to perform a projective mapping operation. During projective mapping, each of the interpolated texture map coordinates is divided by q, thereby canceling any common divisors, such as 1/w. Rather than performing the perspective correction computation of dividing an interpolated texture map coordinate, such as s/w, by 1/w to produce the perspective corrected texture map coordinate s, the perspective correction computation is disabled and s/w is used to perform the perspective mapping function. Specifically, when the perspective correction computation is disabled and projective mapping is performed, s/w is divided by q/w, resulting in s/q. In comparison, when perspective correction is not disabled, s/w is divided by 1/w to produce s which is then divided by q, also resulting in s/q. Note that the result is the same with the perspective correction computation disabled as it is with the perspective correction computation enabled. Therefore, the result will not be affected by the perspective correction computation and the disabled perspective correction computation is not needed to produce the result.

If, in step 255 driver 113 determines that one or more of the perspective correction computations is used to perform a projective mapping operation, then in step 257, driver 113 optimizes each program instruction by modifying each program instruction to source the interpolated texture map coordinates for a projective mapping function, thereby disabling the implicit perspective correction computation. In an alternative embodiment of the present invention, driver 113 removes one or more program instructions that explicitly perform the perspective correction computation to compute the perspective corrected texture map coordinates or disables execution of those program instructions. Driver 113 then proceeds to step 260.

If, in step 255 driver 113 determines that none of the perspective correction computations is used to perform a projective mapping operation, then driver 113 proceeds to step 260. In step 260 driver 113 determines if one or more of the perspective correction computations is used to perform a normalization operation. During normalization, each of the interpolated texture map coordinates, such as s, t, and r, is divided by the square-root of the sum of the squares of each of the texture map coordinates, thereby canceling any common divisors, such as 1/w. Rather than performing the perspective correction computation of dividing an interpolated texture map coordinate, such as s/w, by 1/w to produce the perspective corrected texture map coordinate s, the perspective correction computation is disabled and s/w is used to perform the normalization function. Specifically, when the perspective correction computation is disabled and normalization is performed, s/w is divided by the square-root of $(s/w)^2+(t/w)^2+(r/w)^2$, resulting in s divided by the square-root of $s^2+t^2+r^2$. In comparison, when perspective correction is not disabled, s/w, t/w, and r/w are each divided by 1/w to produce s, t, and r, respectively. s is then divided by the square-root of $s^2+t^2+r^2$. Note that the result is the same with the perspective correction computation disabled as it is with the perspective correction computation enabled. Therefore, the result will not be affected by the perspective correction computation and the disabled perspective correction computation is not needed to produce the result.

If, in step 260 driver 113 determines that one or more of the perspective correction computations is used to perform a normalization operation, then in step 262, driver 113 optimizes each program instruction by modifying each program instruction to source the interpolated texture map coordinates for a normalization function, thereby disabling the implicit perspective correction computation. In an alternative embodiment of the present invention, driver 113 removes one or more program instructions that explicitly perform the perspective correction computation to compute the perspective corrected texture map coordinates or disables execution of those program instructions. Driver 113 then proceeds to step 265.

If, in step 260 driver 113 determines that none of the perspective correction computations is used to perform a normalization operation, then driver 113 proceeds to step 265. In step 265 driver 113 determines if one or more of the perspective correction computations is used to perform a scaling invariant operation. A scaling invariant operation is a mathematical expression that cancels any scaling coefficient, such as a perspective correction parameter, when producing a result. If, in step 265 driver 113 determines that one or more of the perspective correction computations is used to perform a scaling invariant operation, then in step 267, driver 113 modifies each program instruction by sourcing the interpolated texture map coordinates for a normalization function to disable the implicit perspective correction computation. In an alternative embodiment of the present invention, driver 113 removes one or more program instructions that explicitly perform the perspective correction computation to compute the perspective corrected texture map coordinates or disables execution of those program instructions. Driver 113 then proceeds to step 270.

If, in step 265 driver 113 determines that none of the perspective correction computations is used to perform a normalization operation, then driver 113 proceeds to step 270. In step 270 driver 113 determines if one or more of the perspective correction computations can be deferred. For example, a perspective correction computation, such as a divide by 1/w, may be deferred to follow a dot product operation such that the dot product result is scaled rather than scaling each input to the dot product operation.

If, in step 270 driver 113 determines that one or more of the perspective correction computations can be deferred, then in step 272, driver 113 modifies each program instruction is scaled by sourcing the interpolated texture map coordinates for a normalization function to disable the implicit perspective correction computation and adds one or more instructions to perform the deferred perspective correction computation. Driver 113 then proceeds to step 270. If, in step 270 driver 113 determines that none of the perspective correction computations can be deferred, then driver 113 proceeds to step 230 of FIG. 2A.

In some embodiments of the present invention, driver 113 may determine that one or more perspective correction computations may be disabled for other operations and produce the same result as when the one or more perspective correction computations are enabled. In those embodiments, driver 113 may modify one or more program instructions or add one or more program instructions to produce an optimized sequence of program instructions. Persons skilled in the art will appreciate that any system configured to perform the method steps of FIGS. 2A and/or 2B or their equivalents, is within the scope of the present invention. Further, the optimized sequence of program instructions may be, executed by a dedicated fragment shader, such as fragment shader 155. Alternatively, the optimized sequence of program instructions may be executed by a general purpose processor, such as host processor 114.

Figure 3A:
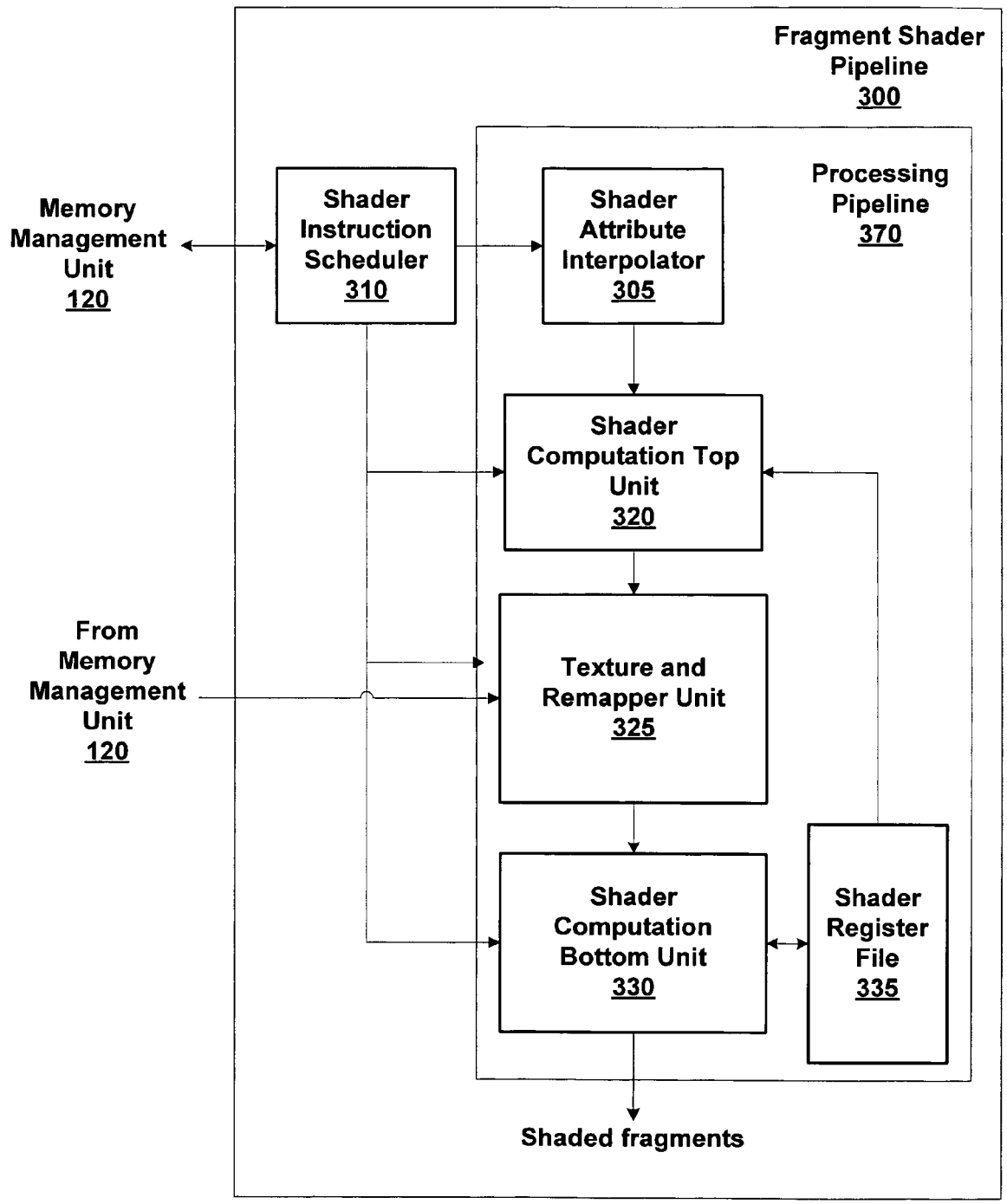
FIG. 3A is a block diagram of a portion of the graphics processor shown in FIG. 1 in accordance with one or more aspects of the present invention.

FIG. 3A is a block diagram of a portion of fragment shader 155 shown in FIG. 1 in accordance with one or more aspects of the present invention. One of more fragment shader pipelines 300 may be included within fragment shader 155. Each fragment shader pipeline 300 is configured to receive shader program instructions, including optimized sequences of program instructions, and fragment data that are processed according to the shader program instructions to produce shaded fragments. The shaded fragments are output by fragment shader 155 to raster operations unit of FIG. 1.

A shader instruction scheduler 310 receives optimized sequence of program instructions and schedules each program instruction for execution by a processing unit in a processing pipeline 370, such as a shader attribute interpolator 305, a shader computation top unit 320, a texture and remapper unit 325, or a shader computation bottom unit 330. In some embodiments of the present invention, the optimized sequence of program instructions are read by shader instruction scheduler 310 from local memory 140 via memory management unit 120.

Shader attribute interpolator 305 produces interpolated attributes, such as texture coordinates, barycentric coefficients, depth (z or w), or the like, that may be sourced by the other processing units within processing pipeline 370. Shader computation top unit 320 performs perspective correction of the interpolated attributes and other operations requiring division and multiplication. Texture and remapper unit 325 computes texture map addresses and reads texture data via memory management unit 120. Shader computation bottom unit 330 receives texture data and interpolated attributes (perspective corrected or not) from texture and remapper unit 325 and produces shaded fragments. A shader register file 335 is a storage resource used to store temporary values needed during execution of the shader programs.

Each processing unit within processing pipeline 370 is configured to execute specific program instructions. Shader instruction scheduler 310 schedules execution of each program instruction for execution by a processing unit that is configured to perform the operation(s) specified by the program instruction. For example, shader attribute interpolator 305 may be configured to perform operations including multiplication, division, and reciprocal. Texture and remapper unit 325 may be configured to perform operations including derivative calculation, texture addressing, and interpolation. Shader computation bottom unit 330 may be configured to perform operations including addition, cosine, sine, dot product, logarithm, and multiplication. In other embodiments of the present invention, additional processing units may be included in fragment shader pipeline 300.

Because a division operation is expensive in terms of computation cycles and/or the number of transistors needed to perform the operation, only a single processing unit, such as shader computation top unit 320, may be capable of performing the division operation. Therefore, a shader program that requires many division operations may be limited in terms of performance. In such cases, shader instruction scheduler 310 may schedule more program instructions for execution by shader computation top unit 320, potentially leaving texture and remapper unit and/or shader computation bottom unit 330 underutilized. In contrast, an optimized shader program in which some perspective correction computations, specifically divide operations, are disabled may result in improved performance while achieving the same result as a corresponding unoptimized shader program in terms of the shaded fragments output by shader computation bottom unit 330.

Figure 3B:
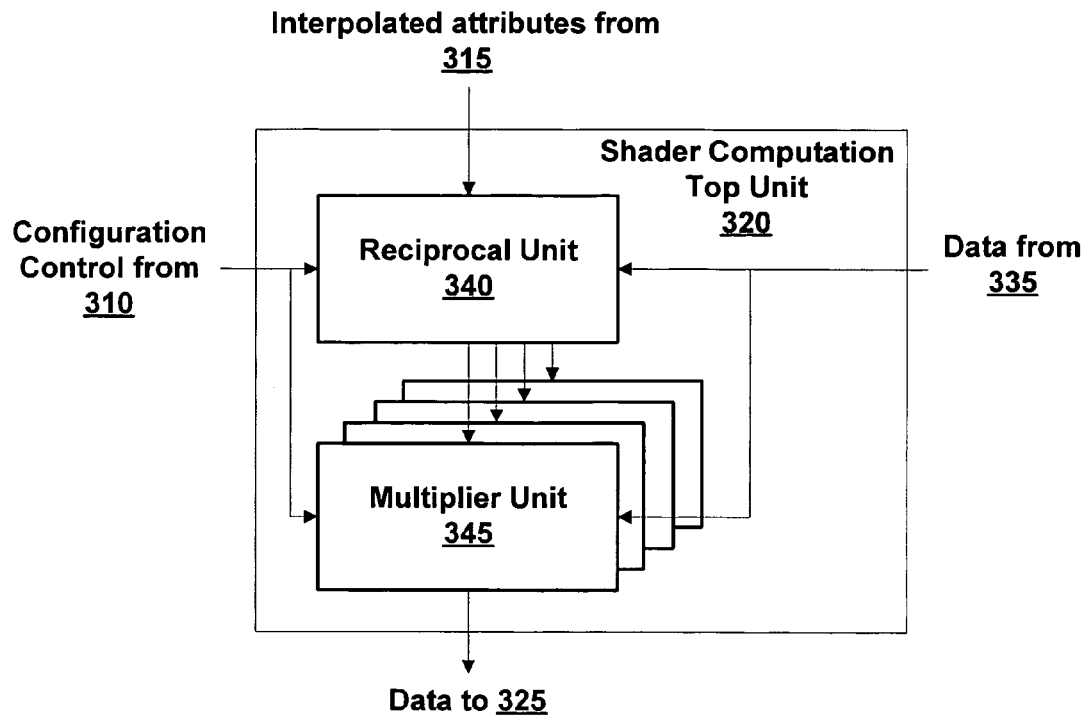
FIGS. 3B and 3C are block diagrams of portions of the fragment shader shown in FIG. 3A in accordance with one or more aspects of the present invention.

FIG. 3B is a block diagram of shader computation top unit 320 shown in FIG. 3A in accordance with one or more aspects of the present invention. Shader computation top unit 320 includes a reciprocal unit 340 and four multiplier units 345. Reciprocal unit 340 may be used with one or more of the four multiplier units 345 to perform division operations. Shader computation top unit 320 receives configuration control information, i.e. microinstructions, from shader instruction scheduler 310, interpolated attributes from shader attribute interpolator 315, and data from shader register file 335.

In one embodiment of the present invention, a program instruction sourcing an interpolated attribute from shader attribute interpolator 305 includes an implicit divide by a perspective correction parameter, 1/w. The microinstruction corresponding to the program instruction configures scaler computation top unit 320 to perform the division operation during a first pass through processing pipeline 370. If the next program instruction also requires reciprocal unit 340, the next program instruction is scheduled for a second pass through processing pipeline 370 and texture and remapper unit 325 and shader computation bottom unit 330 are idle for the first pass. When the next program instruction does not require reciprocal unit 340, the next program instruction may be scheduled for execution by shader computation bottom unit 330 if it is available.

Figure 3C:
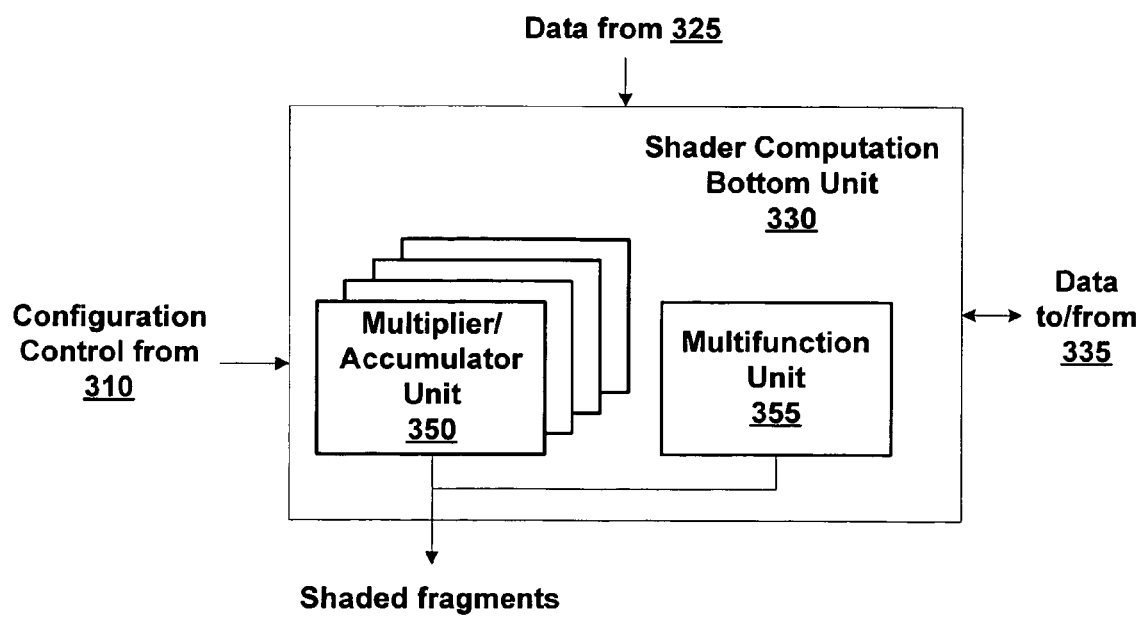

FIG. 3C is a block diagram of shader computation bottom unit 330 shown in FIG. 3A in accordance with one or more aspects of the present invention. Shader computation bottom unit 330 includes a multifunction unit 355 and four multiplier/accumulator units 350. Multifunction unit 355 may be configured to perform cosine, sine, and base-two power and log operations. Shader computation bottom unit 330 receives configuration control information, i.e. microinstructions, from shader instruction scheduler 310, interpolated attributes and texture data from texture and remapper unit 325, and data from shader register file 335. Shader computation bottom unit 330 may store temporary values in shader register file 335 for use by shader computation top unit 320, texture and remapper unit 325, and shader computation bottom unit 330. Shader computation bottom unit 330 also produces shaded fragments for output by fragment shader 155.

Table 1 illustrates the sequence of (unoptimized) program instructions scheduled for execution by shader instruction scheduler 310. The first column specifies the pass through processing pipeline during which the instruction is executed. The second column specifies the processing unit scheduled to execute each program instruction, where SCT is shader computation top unit 320 and SCB is shader computation bottom unit 330. The third column is the program instruction, including source and destination operands.

TABLE 1

| Pass 1 | SCT | MOV r0, f[0] |
| Pass 2 | SCT | RCP r0.x, r0.x |
| Pass 3 | SCT | MOV r1, f[1] |
| Pass 3 | SCB | MUL r0, r0, r1 |
| Pass 4 | SCB | MUL r0, r0, r0 |

A move instruction (MOV) is scheduled for execution by shader computation top unit 320 during pass 1. By sourcing the operand f[0] from shader attribute interpolator 305, an implicit perspective correction computation of dividing by 1/w is scheduled for execution by shader computation top unit 320. Specifically, an interpolated attribute, stored in f[0] is sourced, divided by 1w and stored in r0 of shader register file 335. The second program instruction, a reciprocal (RCP) must by scheduled for execution by shader computation top unit 320, and therefore shader computation bottom unit 330 and texture and remapper unit 325 are idle during pass 1.

The RCP is scheduled for execution by shader computation top unit 320 during pass 2. Specifically, an x field of r0 is input to reciprocal unit 340 and the resulting reciprocal is stored in the x field of r0. The third program instruction, another MOV sources operand f[1] from shader attribute interpolator 305, again requiring an implicit perspective correction computation. Therefore, the third instruction is scheduled for execution by shader computation top unit 320 during a third pass, pass 3. As was the case during pass 1, shader computation bottom unit 330 and texture and remapper unit 325 are idle during pass 2.

The fourth program instruction, a multiply (MUL) may be scheduled for execution by shader computation bottom unit 330 and is therefore scheduled for execution during pass 3. The fifth program instruction, another MUL may be scheduled for execution by either shader computation top unit 320 or shader computation bottom unit 230. However, both units are already scheduled during pass 3, so the second MUL program instruction is scheduled for execution during pass 4.

When the program instructions illustrated in Table 1 are optimized to disable unnecessary perspective correction computations the number of passes needed to process the program instructions is reduced from four to two as illustrated in Table 2.

TABLE 2

| Pass 1 | SAI | MOV r0, g[0] |
| Pass 1 | SCT | RCP r0.x, r0.x |
| Pass 2 | SAI | MOV r1, g[1] |
| Pass 2 | SCT | MUL r0, r0, r1 |
| Pass 2 | SCB | MUL r0, r0, r0 |

The first MOV instruction is optimized to source the operand g[0] from shader attribute interpolator 305. By sourcing g[0] instead of f[0] execution of the implicit perspective correction computation of dividing by 1/w is disabled and execution of the first MOV instruction is scheduled for execution by shader attribution interpolator 305. Driver 113 may set a bit in a specific field of the program instruction when it is optimized to indicate that execution of the perspective correction computation is disabled. Because the division operation is not scheduled, shader computation top unit 320 is available for processing during pass 1. Therefore, the second optimized program instruction, RCP is scheduled for execution by shader computation top unit 320 during pass 1. Although shader computation bottom unit 330 and texture and remapper unit 325 are idle during pass 1, two of the optimized program instructions are executed during pass 1.

The third optimized program instruction, another MOV sources operand g[1] from shader attribute interpolator 305, again the implicit perspective correction computation is disabled, so the MOV instruction is scheduled for execution by shader attribute interpolator 305 during pass 2. The fourth optimized program instruction, a multiply (MUL) may be scheduled for execution by either shader computation top unit 320 or shader computation bottom unit 330 and is therefore also scheduled for execution during pass 2. The fifth optimized program instruction, another MUL may be scheduled for execution by either shader computation top unit 320 or shader computation bottom unit 330 and is also scheduled for execution during pass 2.

The optimized program instructions are scheduled for execution in 2 passes compared with 4 passes needed to execute the unoptimized program instructions. The number of clock cycles needed to execute the program including the optimized program instructions is reduced, therefore performance is improved. In some cases, it may be desirable to increase the complexity of the program to improve image quality while maintaining the same level of performance. Therefore, graphics processing performance may be improved in terms of processing speed and/or image quality by optimizing shader program instructions to selectively disable perspective correction computations for each program instruction.

Figure 4:
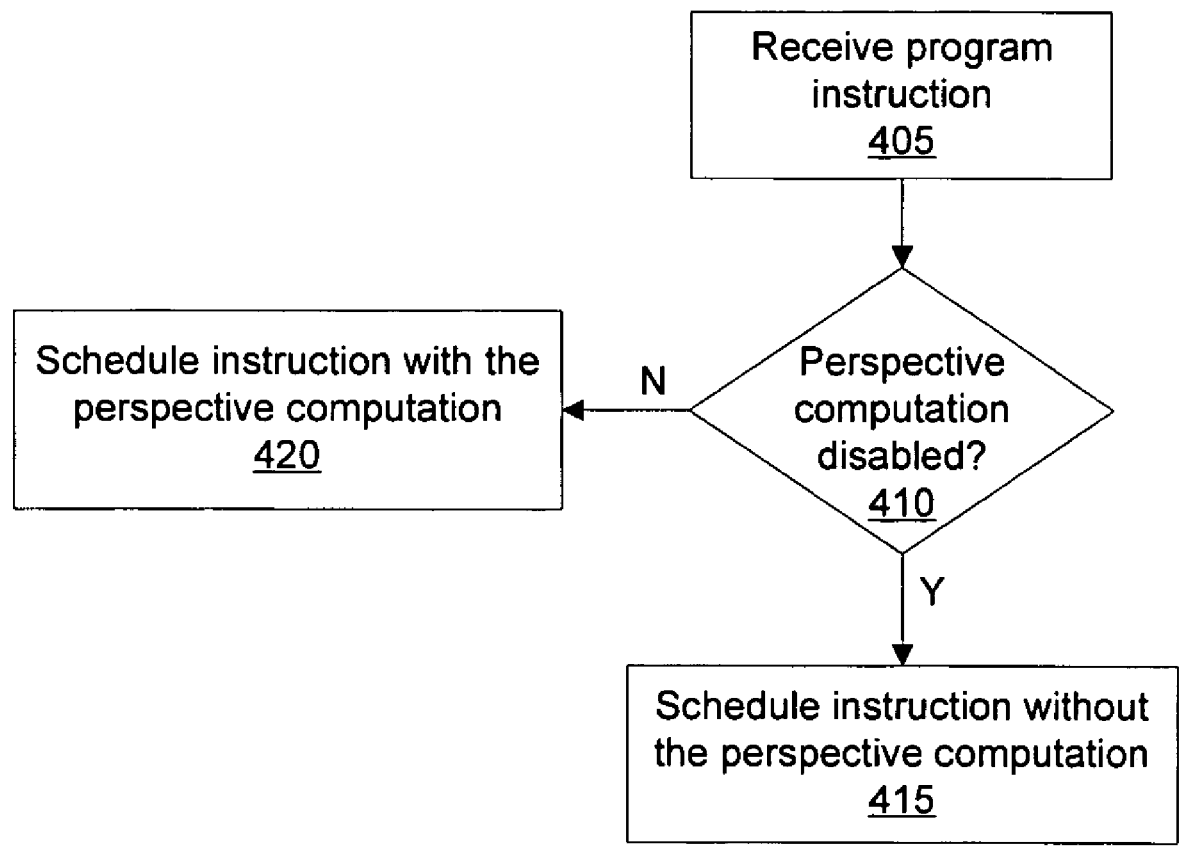
FIG. 4 illustrates a flow diagram of an exemplary method of scheduling an optimized sequence of program instructions in accordance with one or more aspects of the present invention.

FIG. 4 illustrates an embodiment of a method of executing an optimized sequence of program instructions in accordance with one or more aspects of the present invention. In step 405 shader instruction scheduler 310 receives an optimized program instruction. In step 410 shader instruction scheduler 310 determines if the optimized program instruction indicates a perspective correction computation is disabled, and, if not, in step 415 shader instruction scheduler 310 schedules the optimized program instruction for execution including execution of the perspective correction computation. If, in step 410 shader instruction scheduler 310 determines the optimized program instruction indicates a perspective correction computation is not disabled, then in step 415 shader instruction scheduler 310 schedules the optimized program instruction for execution without performing the perspective correction computation.

After completing step 420 or 415 the optimized program instruction is executed by processing pipeline 370. Persons skilled in the art will appreciate that any system configured to perform the method steps of FIG. 4 or their equivalents, is within the scope of the present invention.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of optimizing perspective correction computations to be executed in a programmable fragment shader, comprising:
   identifying a perspective correction computation in a sequence of program instructions;
   the state of a bit included in the perspective correction computation instruction, checking the bit to determine a projective mapping operation;
   determining whether the perspective correction computation instruction in the sequence of program instructions can be optimized based on the status of the bit;
   if so, then sourcing one or more interpolated texture map coordinates (s/w, t/w, r/w) to thereby disable the perspective correction computation comprising division of t and r by (1/w); and
   executing one of a plurality of perspective computation functions by using an operation in a shader unit without dividing the interpolated texture maps coordinates by (1/w).

2. The method of claim 1, wherein if the sequence of program instructions cannot be optimized, then the process is complete.

3. The method of claim 1, wherein if the sequence of program instructions can be optimized, then a driver disables the perspective connection instructions to disable division by (1/w).

4. The method of claim 3, wherein the device further enables by replacing a program instruction so that the result will not be affected.

5. The method of claim 3, wherein the device further enables the optimization by altering a bit within a program instruction to disable the division by (1/w).

6. The method of claim 1, wherein the sequence of program instructions is configured to perform a cube mapping operation by dividing the interpolated texture map coordinate (s/w) by each one of s/w, (t/w) and (r/w).

7. The method of claim 1, wherein the sequence of program instructions is configured to perform a projective texture mapping operation by dividing the interpolated texture map coordinate by (g/w).

8. The method of claim 1, wherein the sequence of program instructions is configured to perform a normalization operation by dividing each of the interpolated texture map coordinates by the square root of the sum of the squares of each of the interpolated texture map coordinates.

9. The method of claim 1, wherein the sequence of program instructions is configured to perform a scaling invariant operation by sourcing the result of the interpolated texture map coordinates resulting from a normalization operation.

10. The method of claim 1, wherein a device driver performs the steps of identifying, checking and determining.

11. A system for processing shader program instructions to be executed in a programmable fragment shader, comprising:
   a perspective correction computation unit configured to perform a step of dividing a value by a perspective correction parameter to produce a perspective corrected value;
   an instruction scheduling unit configured to execute the steps of identifying a perspective correction computation instruction in a sequence of program instructions;
   checking the state of a bit included in the perspective correction computation instruction, the bit determining a projective mapping operation;

determining whether the perspective correction computation instruction in the sequence of program instructions can be optimized;

if so, then sourcing one or more interpolated texture map coordinates (s/w, t/w, r/w) to thereby disable the perspective correction computation comprising division of s, t, r by (1/w); and executing of one of a plurality of perspective computation functions using an operation in the shader without dividing the interpolated texture maps coordinates by (1/w).

12. The system of claim 11, wherein the instruction scheduling unit is configured to schedule execution of an additional instruction when of the step of dividing the value by the perspective correction parameter is disabled.

13. The system of claim 11, wherein an instruction includes a bit indicating whether the step of dividing the value by the perspective correction parameter should be performed.

14. A method of performing computations to be executed in a programmable fragment shader using perspective correction, comprising:

receiving a program instruction from a sequence of program instructions;

determining whether the program instruction indicates that dividing by a perspective correction parameter is disabled; and scheduling the program instruction for execution without dividing by the perspective correction parameter, the scheduling comprising sourcing one or more interpolated texture map coordinates (s/w, t/w, r/w) to thereby disable the perspective correction computation comprising division of one or more of the interpolated texture map coordinates by (1/w); and executing one of a plurality of perspective computation functions using a single operation in a shader unit without division of the interpolated texture maps coordinates by (1/w).

15. The method of claim 14, wherein the program instruction includes a bit indicating whether or not dividing by the perspective correction parameter is disabled.

16. The method of claim 14, wherein the sequence of program instructions is configured to perform a cube mapping operation by dividing the interpolated texture map coordinate (s/w) by each one of s/w, (t/w) and (r/w).

17. The method of claim 14, wherein the sequence of program instructions is configured to perform a projective texture mapping operation by dividing the interpolated texture map coordinate by (q/w).

18. The method of claim 14, wherein the sequence of program instructions is configured to perform a normalization operation by dividing each of the interpolated texture map coordinates by the square root of the sum of the squares of each of the texture map coordinates.

19. The method of claim 14, wherein the sequence of program instructions is configured to perform an operation that can be deferred.

20. The method of claim 14, wherein the sequence of program instructions is configured to perform a scaling invariant operation by sourcing the result of the interpolated texture map coordinates resulting from a normalization operation.

* * * * *